W. G. PRICE.
BRAKE RIGGING.
APPLICATION FILED MAR. 2, 1910.

1,053,216.

Patented Feb. 18, 1913.
2 SHEETS—SHEET 1.

WITNESSES.
J. R. Keller
Robert C. Totten

INVENTOR.
William Gunn Price
By Kay & Totten
Attorneys

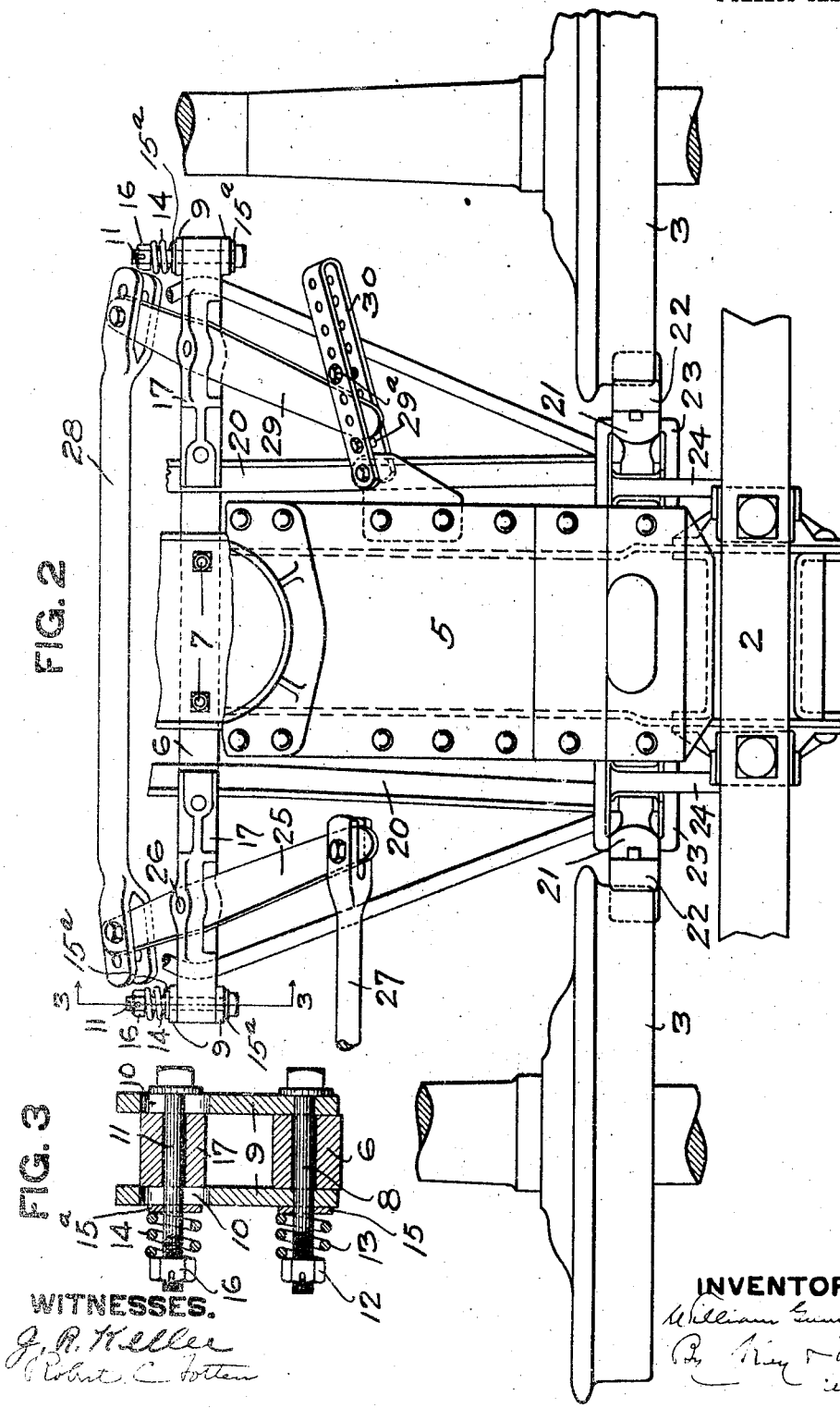

UNITED STATES PATENT OFFICE.

WILLIAM GUNN PRICE, OF NEW CASTLE, PENNSYLVANIA.

BRAKE-RIGGING.

1,053,216. Specification of Letters Patent. Patented Feb. 18, 1913.

Application filed March 2, 1910. Serial No. 546,845.

*To all whom it may concern:*

Be it known that I, WILLIAM GUNN PRICE, a resident of New Castle, in the county of Lawrence and State of Pennsylvania, have invented a new and useful Improvement in Brake-Rigging; and I do hereby declare the following to be a full, clear, and exact description thereof.

My improvement relates to brake rigging, its object being to provide for the supporting of the brake shoes in proper alinement with the wheels so that they will be held in proper contact with the wheels, and will not be permitted to drag when released, whereby greater efficiency of the braking action will be obtained and the life of the brake shoe increased.

A further object is to provide friction means to cause to operate an automatic brake slack adjuster.

To these ends my invention comprises the novel features hereinafter set forth and claimed.

Figure 1:
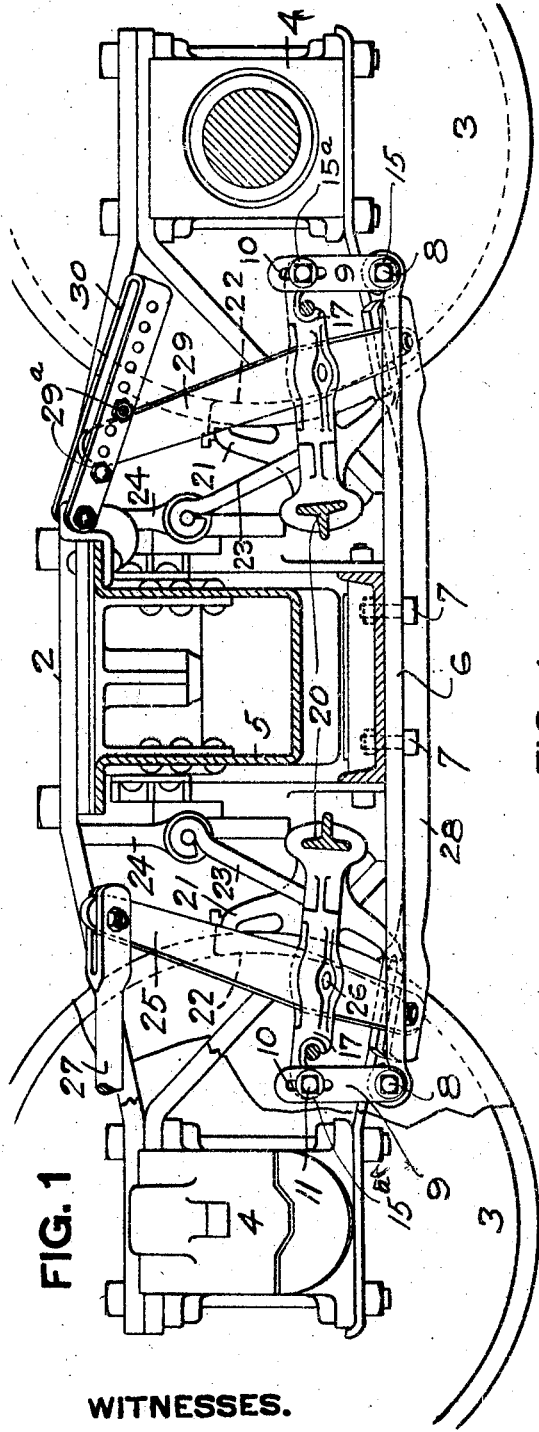
Figure 4:
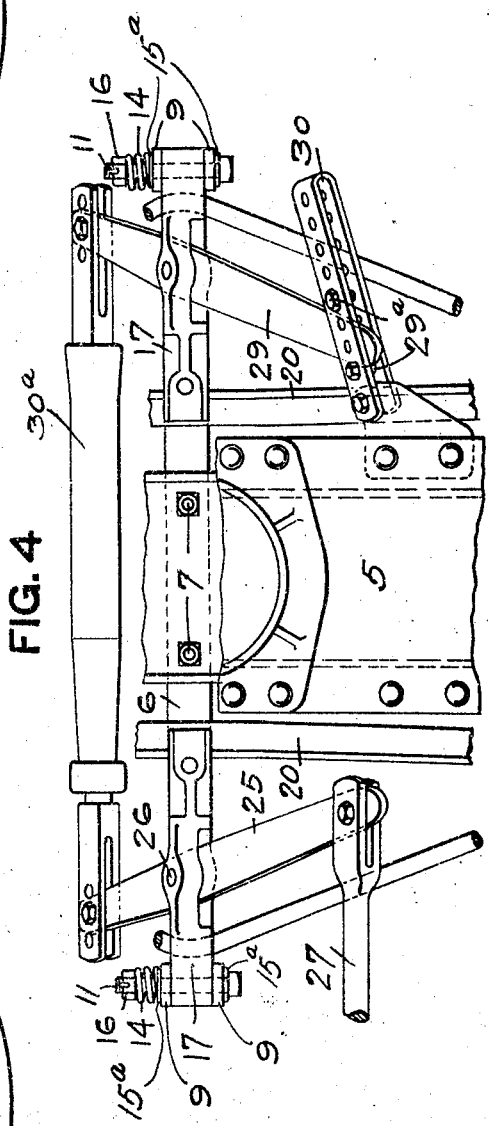

In the drawings Figure 1 is a side elevation partly in section along the center line of the truck; Fig. 2 is a plan view; Fig. 3 is a section on the line 3—3, Fig. 2; and Fig. 4 is a modified form.

In the drawings the numeral 2 designates a suitable truck frame provided with wheels 3, the journal-boxes 4, the transoms 5 and other parts all combined and arranged to form a suitable truck. A rigid bar 6 is secured by bolts 7 to the transoms or truck-frame 5. Pivotally secured to the bar 6 by bolts 8 are the links 9. These links are provided with the slots 10 which receive the bolts 11. Interposed between the links 9 and the nuts 12 on said bolts 8 are the springs 13 creating friction between the links 9 and the bar 6 for the purposes fully hereinafter set forth. Washers 15 are employed. Like springs 14 are carried by the bolts 11 and interposed between washers 15$^a$ and the nuts 16. The brake-beam fulcrums 17 are pivotally mounted on the bolts 11, the springs 14 creating friction between the links 9 and the brake-beam fulcrums 17. The bolts 11 have a certain amount of vertical play in the slots 10 in the links 9 for the purpose fully hereinafter set forth.

The inner ends of the brake beam fulcrums 17 are connected to the brake-beams 20 and said brake-beams carry the heads 21 and shoes 22. The hangers 23 are suspended from the brackets 24 and said hangers are connected to the brake-heads 21 and said hangers support the brake-beam heads and shoes. The live-lever 25 is pivotally secured to the brake-beam fulcrum 17 by the bolt 26 and the upper end of said lever is connected to the brake-rod 27, while the lower end is connected to the slack adjuster 28.

The dead-lever 29 is connected to the opposite end of the slack adjuster and is pivotally secured to the brake-beam fulcrum, the upper end of said dead lever being held in the guide bracket 30 which rests between the bolts 29$^x$.

The rigid bar 6 by means of the slot or friction links 9 supports the brake-beam fulcrum from swinging down and so keeps the brake-shoes in alinement with the treads of the wheels. When the brake-shoes are forced against the wheels by the application of the brakes, the slots 11 permit the brake beam and shoes to rotate on the hangers 23 to the position required for the shoes to fit and lie in alinement with the treads of the wheels. When the shoes are released from the wheels, the friction links 9 and supporting bar 6 through the fulcrum 17 and brake-beams 20 retain the shoes in alinement with the treads of the wheels, so that the whole bearing surface of the shoes is released from the tread of the wheels, and the shoes are held by the friction of the links 9 in this position.

By the above construction the fulcrums 17 are permitted to move vertically and so allow for the rotation of the brake-beams on their hangers to any extent which may be necessary to bring the shoes in proper engagement with the treads of the wheels, and so prevent the dragging of the shoes on the wheel and the unnecessary and uneven wear caused thereby.

In Fig. 4 I have illustrated my invention in connection with a brake rigging in which an automatic slack adjuster 30ª is employed. This automatic slack adjuster may be of any suitable construction, that illustrated forming the subject matter of United States Letters Patent granted March 8, 1910, No. 951,577 to William K. Price. It has not been deemed necessary to illustrate or describe this slack adjuster in detail. When the automatic slack adjuster is employed, the friction produced by the springs 13 and 14 surrounding the bolts 8 and 11 on the links 9 creating a friction between said links causes a frictional resistance to the movement of the brake-beams and shoes from the wheels so that when the brake-rod 27 moves toward the bolster, as the brakes are released, the live-lever does not move away from the wheel where it is connected to the brake beam fulcrum, and the lower end of the live-lever is caused to move toward the wheel thus pulling out the movable member at one end of the automatic slack adjuster which operates the same and takes the slack due to the wear of the brake-shoes.

What I claim is:

1. In brake-rigging, the combination with a suitable truck-frame and its wheels, of a brake-beam carried thereby, brake-shoes, a brake-beam fulcrum connected at one end to said brake-beam, links supported by said truck-frame pivotally connected to said brake-beam fulcrum, means for automatically varying the point of connection of said brake-beam fulcrum with said links, and brake operating mechanism.

2. In brake-rigging, the combination with a suitable truck-frame and its wheels, of a brake-beam supported thereby, brake-shoes, a brake-beam fulcrum connected to said brake beam, links carried by said truck-frame, and having a vertically movable pivotal connection with said brake-beam fulcrum, and brake operating mechanism.

3. In brake-rigging, the combination with a suitable truck-frame and its wheels, of a brake-beam supported thereby, brake shoes, a brake-beam fulcrum connected to said brake-beam, links pivotally connected to said truck-frame and having a movable pivotal connection with said brake-beam fulcrum, frictional means at the pivotal points, and brake operating mechanism.

4. In brake rigging, the combination with a suitable truck-frame and its wheels, of a brake-beam supported thereby, brake-shoes, a brake-beam fulcrum, links having an automatically adjustable connection with said brake-beam fulcrum, and connected to the truck-frame, and brake operating mechanism.

5. In brake-rigging, the combination with a suitable truck-frame and its wheels, of a brake-beam supported thereby, brake shoes, a brake-beam fulcrum, links pivotally connected to said truck-frame, said links having slots therein, pivotal means connecting said brake beam fulcrum and said links and passing through said slots, and brake operating mechanism.

6. In brake-rigging, the combination with a suitable truck-frame and its wheels, of a brake-beam supported thereby, brake shoes, a brake beam fulcrum, links pivotally connected to the truck-frame, springs at said pivotal points to create friction, said links having slots, pivotal means connecting said links and brake beam fulcrums through said slots, springs at the pivotal points for creating friction, and brake operating mechanism.

7. In brake-rigging, the combination with a suitable truck frame and its wheels, of a brake beam supported thereby, brake shoes, a brake beam fulcrum, a link pivotally connected to said truck frame and to the said brake beam fulcrum, a slot in the said link at one of the said pivots, springs at the said pivots for producing friction between the link and its connections to the said truck-frame, and to the said brake beam fulcrum and brake operating mechanism.

8. In brake rigging, the combination with a suitable truck frame and its wheels, of a brake beam supported thereby, brake shoes, a brake beam fulcrum, a link, the said link being pivotally connected to the said truck frame and to the said brake beam fulcrum, said link being automatically adjustable in length, and brake operating mechanism.

9. In brake rigging, the combination with a suitable truck frame and its wheels, of a brake beam supported thereby, brake shoes, a brake beam fulcrum, a link, the said link being pivotally connected to the said truck frame and to the said brake beam fulcrum, said link having friction producing springs at its pivots, said link being automatically adjustable in length, a slack adjuster, brake operating mechanism, the friction at the pivots of the said link acting with the slack adjuster to take up the slack of the brake shoes.

10. The combination with a suitable truck-frame and its wheels, of a brake rigging having brake-beams, brake shoes, brake-beam fulcrums, a link, said link connecting the brake-beam fulcrum to the truck-frame, said link being automatically adjustable in length, said link having friction producing means at its pivots, a slack adjuster, a brake operating mechanism, the friction at the pivots of the said link acting with the slack adjuster to take up the slack of the shoes.

11. In a brake-rigging, the combination with a suitable truck frame and its wheels, of a brake-beam, brake-beam hangers, a brake beam fulcrum, brake shoes, a link, a brake operating mechanism, said link connecting the said brake beam fulcrum to the said truck-frame, said link being automatically adjustable in length, said link resisting by friction means the rotation of the brake-beam and the movement of the brake-beam away from the wheels.

In testimony whereof, I the said WILLIAM GUNN PRICE have hereunto set my hand.

WILLIAM GUNN PRICE.

Witnesses:
ROBERT C. TOTTEN,
J. F. WILL.